(12) United States Patent
Oda

(10) Patent No.: US 11,986,887 B2
(45) Date of Patent: May 21, 2024

(54) LATHE

(71) Applicant: STAR MICRONICS CO., LTD., Shizuoka (JP)

(72) Inventor: Junya Oda, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 0 days.

(21) Appl. No.: 17/703,183

(22) Filed: Mar. 24, 2022

(65) Prior Publication Data

US 2022/0305562 A1 Sep. 29, 2022

(30) Foreign Application Priority Data

Mar. 24, 2021 (JP) .................................. 2021-049511

(51) Int. Cl.
*B23B 3/30* (2006.01)
*B23B 3/06* (2006.01)
*B23Q 5/40* (2006.01)

(52) U.S. Cl.
CPC .................. *B23B 3/06* (2013.01); *B23B 3/30* (2013.01); *B23Q 5/40* (2013.01); *B23Q 2705/102* (2013.01); *B23Q 2705/24* (2013.01)

(58) Field of Classification Search
CPC ....... B23B 13/12; B23B 13/121; B23B 13/04; B23B 29/24; B23B 29/244; B23B 29/248; B23B 29/242; B23Q 1/703; B23Q 1/70; B23Q 5/32; B23Q 5/326; B23Q 5/34; B23Q 5/40; B23Q 5/402; B23Q 5/404;
(Continued)

(56) References Cited

U.S. PATENT DOCUMENTS 4,080,853 A * 3/1978 Goto .................. B23Q 11/0032
82/120
4,195,538 A * 4/1980 Brown ............... B23Q 11/0825
285/302

(Continued)

FOREIGN PATENT DOCUMENTS

DE 20021676 U1 5/2001
DE 102009058649 A1 * 6/2011 ............. B23B 29/24
(Continued)

OTHER PUBLICATIONS

European Search Report dated Mar. 13, 2022 corresponding to Application No. 22164054.3, 8 pages.

*Primary Examiner* — Nicole N Ramos
(74) *Attorney, Agent, or Firm* — Muncy, Geissler, Olds & Lowe, P.C.

(57) ABSTRACT

A lathe includes a spindle rotatable on a spindle axis, a tool post to which a tool is attachable, an X1-axis ball screw extended in an X1-axis direction perpendicular to the spindle axis and capable of moving the tool post in the X1-axis direction, and an X1-axis support bearing provided on an end of the X1-axis ball screw with respect to the X1-axis direction to restrict movement of the X1-axis ball screw in the X1-axis direction. The tool post is provided with an X1-axis ball screw nut engaged with the X1-axis ball screw. The X1-axis ball screw nut is movable in the X1-axis direction according to rotation of the X1-axis ball screw. The direction that the X1-axis ball screw nut approaches the X1-axis support bearing faces the same direction as the direction that the tool cuts into the workpiece.

8 Claims, 9 Drawing Sheets

(58) Field of Classification Search
CPC ........ B23Q 5/406; B23Q 5/408; B23Q 3/106; B23Q 3/107; B23Q 3/108
See application file for complete search history.

(56) References Cited

U.S. PATENT DOCUMENTS

| | | | |
|---|---|---|---|
| 5,349,731 A * | 9/1994 | Sheehan | B23Q 5/404 29/27 R |
| 5,782,151 A * | 7/1998 | Shiramasa | B23Q 5/40 483/45 |
| 6,240,796 B1 * | 6/2001 | Yamada | B23Q 5/42 74/89.23 |
| 2002/0088317 A1 | 7/2002 | Chen | |
| 2012/0257941 A1 * | 10/2012 | Mendia Olabarria | B23Q 1/70 409/230 |
| 2013/0104707 A1 * | 5/2013 | Nakagawa | B23B 25/06 82/152 |

FOREIGN PATENT DOCUMENTS

| | | |
|---|---|---|
| JP | S5682148 A | 7/1981 |
| JP | S6186104 A | 5/1986 |
| JP | 2002509489 A | 3/2002 |

* cited by examiner

Front Side ⟵⟶ Rear Side

Front Side ⟵⟶ Rear Side

Front Side ⟷ Rear Side

LATHE

CROSS-REFERENCE TO RELATED APPLICATIONS

This application claims priority of Japanese Patent Application No. 2021-049511 filed on Mar. 24, 2021. The contents of this application are incorporated herein by reference in their entirety.

BACKGROUND OF THE INVENTION

The present invention relates to a lathe provided with a spindle and a tool post.

A well-known lathe is provided with a rotatable spindle capable of holding a workpiece and a tool post where a tool is attachable to machine the workpiece held by the spindle. Japanese Unexamined Patent Application Publication (Translation of PCT Application) No. 2002-509489 discloses that the workpiece held by the spindle is machined with the tool as the tool post moves in a cutting direction that the tool cut into the workpiece. The tool post is provided with a driven unit. The driven unit is engaged with a driving shaft whose movement in the axial direction is restricted by a movement restricting unit. Rotation of the driving shaft causes the driven unit to move in the axial direction. The axial direction of the driving shaft matches with the cutting direction. Rotating the driving shaft by the motor moves the tool post in the cutting direction or in the opposite direction according to rotational direction of the driving shaft.

SUMMARY

In the lathe as disclosed in Japanese Unexamined Patent Application Publication (Translation of PCT Application) No. 2002-509489, the movement restricting unit is brought distant from the driven unit of the tool post when the tool post moves in the cutting direction to allow the tool to cut into the workpiece. Thermal expansion and contraction of the driving shaft causes variation in a cutting amount by the tool, thereby causing deterioration in machining accuracy.

The present invention provides a lathe capable of improving machining accuracy.

A lathe may include a spindle capable of holding a workpiece and rotatable on a spindle axis, a tool post to which a tool is attachable, the tool being capable of machining the workpiece by moving in a direction cutting into the workpiece held by the spindle, a driving shaft extended in an axial direction perpendicular to the spindle axis and capable of moving the tool post in the axial direction, and a movement restricting unit provided on an end of the driving shaft with respect to the axial direction to restrict movement of the driving shaft in the axial direction. The tool post may be provided with a driven unit engaged with the driving shaft. The driven unit may be movable in the axial direction according to rotation of the driving shaft. The axial direction may include a direction that the driven unit approaches the movement restricting unit. The direction that the driven unit approaches the movement restricting unit may face the same direction as the direction that the tool cuts into the workpiece.

The driven unit may approach the movement restricting unit when the tool moves in the cutting direction that the tool cuts into the workpiece. The driven unit and the movement restricting unit may be in proximity during machining, which suppresses influence on a cutting amount by the tool regardless of thermal expansion or contraction of the driving shaft with respect to the axial direction, thereby improving machining accuracy.

A guide bush may be provided in front of the spindle to support the workpiece rotatably on the spindle axis. The driving shaft may be a ball screw. The driven unit may be a ball screw nut engaged with the ball screw. The movement restricting unit may be a roller bearing. The lathe may be provided with a motor capable of driving the driving shaft. The cutting direction that the tool cuts into the workpiece may match with the direction that the driven unit approaches the motor. An output shaft of the motor may extend coaxially with the driving shaft.

The driven unit on the tool post may be arranged in a position on the side facing the direction that the tool cuts into the workpiece.

The driven unit and the movement restricting unit may be in proximity during machining, which suppresses influence on a cutting amount by the tool regardless of thermal expansion or contraction of the driving shaft with respect to the axial direction, thereby improving machining accuracy.

The lathe may further include a motor capable of rotating the driving shaft. The motor may be arranged on the side facing the direction that the tool cuts into the workpiece with respect to the tool post.

Such configuration can contribute to a reduction in size of the lathe. If the motor is arranged on the opposite side, the tool post and the motor would be both disposed side by side on one side of the lathe with respect to the spindle, causing an increase in size of the lathe.

The lathe may further include a motor capable of rotating the driving shaft. The tool post may be arranged on the rear side of the lathe with respect to the spindle axis. The motor may be arranged on the front side of the lathe with respect to the tool post.

Such configuration can contribute to a reduction in size of the lathe. If the motor is arranged on the further rear side of the lathe than the tool post arranged on the rear side of the lathe with respect to the spindle axis, the motor and the support structure thereof would project rearwards, causing an increase in size of the lathe.

The lathe may further include a motor capable of rotating the driving shaft. The tool post may be arranged on the front side of the lathe with respect to the spindle axis. The motor may be arranged on the rear side of the lathe with respect to the tool post.

Such configuration can contribute to a reduction in size of the lathe. If the motor is arranged on the further front side of the lathe than the tool post arranged on the front side of the lathe with respect to the spindle axis, the motor and the support structure thereof would project forwards, causing an increase in size of the lathe.

The motor may be arranged in a position above the spindle. The motor may include a servo motor.

The invention provides a lathe capable of improving machining accuracy.

DETAILED DESCRIPTION

Figure 1:
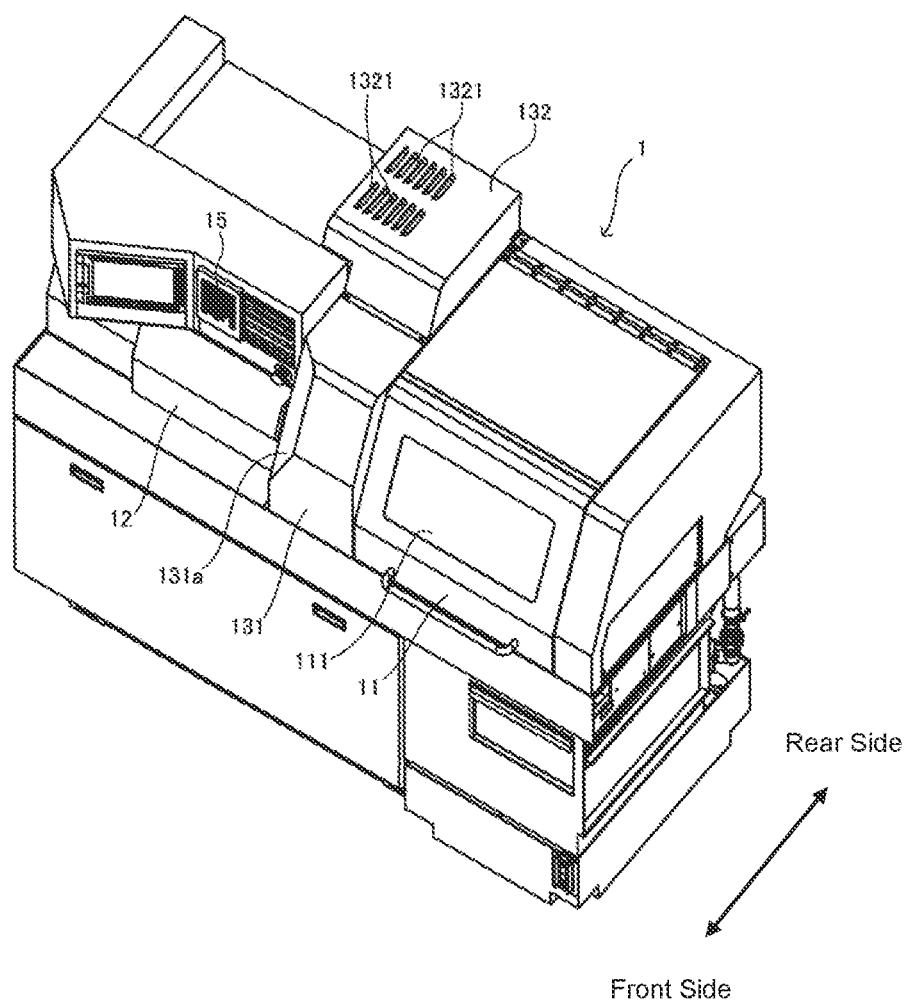
FIG. 1 is a perspective view of an NC lathe of an embodiment.

Hereinafter, an embodiment of the present invention will be described referring to the drawings. The invention embodied in an NC (Numerical Control) lathe is being described.

Figure 2:
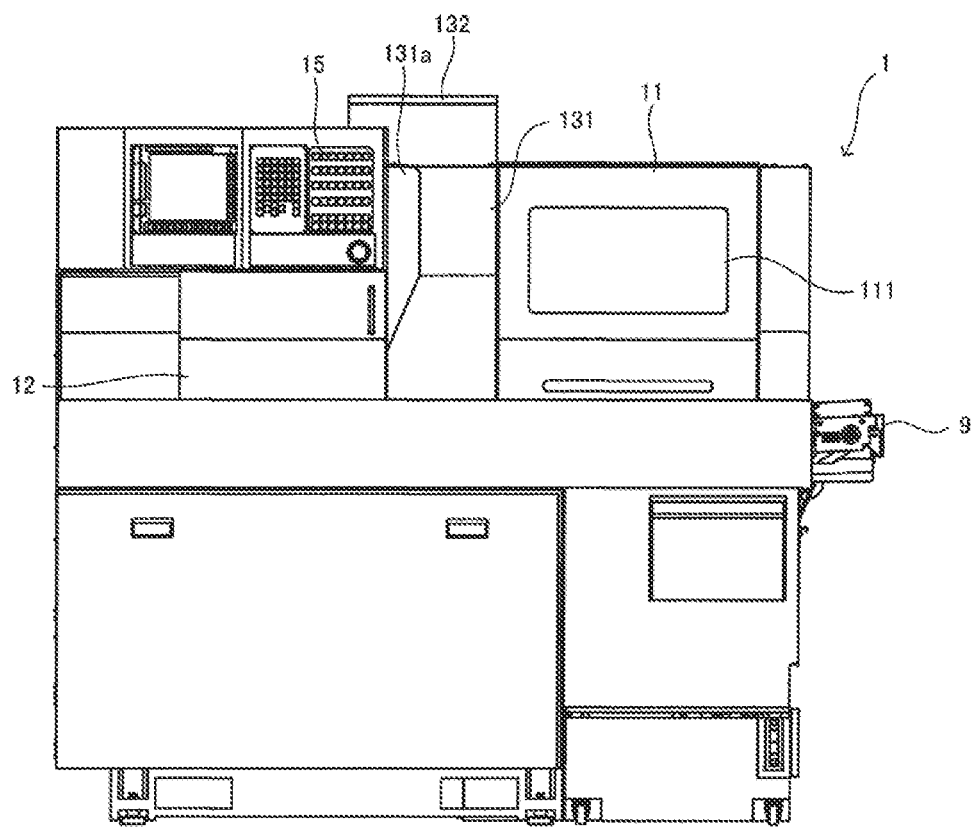
FIG. 2 is a front view of the NC lathe.

FIG. 1 is a perspective view of an appearance of an NC lathe of the embodiment. FIG. 2 is a front view of the appearance of the NC lathe as shown in FIG. 1.

As shown in FIG. 1 and FIG. 2, an NC lathe 1 may have a machining chamber 11, a headstock chamber 12, and an operation panel 15 all mounted on a base. The NC lathe 1 may be an example of the lathe. The front left side of FIG. 1 may be the front side of the NC lathe 1 and the rear right side may be the rear side of the NC lathe 1. FIG. 2 further shows a downstream end of a discharge conveyor 9 capable of conveying a finished product to the outside of the NC lathe 1. The machining chamber 11 may be arranged on the right side of the NC lathe 1 as seen from front. The machining chamber 11 may be provided with a window 111 on the front side of the chamber 11 through which the inside of the chamber 11 can be seen. The headstock chamber 12 may be arranged on the left side of the NC lathe 1 as seen from front. The machining chamber 11 and the headstock chamber 12 may be apart. A guide bush supporting bed 41 (FIG. 3) and a first tool post 5 (FIG. 3) may be arranged in a part between the machining chamber 11 and the headstock chamber 12. Hereinafter, the part between the machining chamber 11 and the headstock chamber 12 may be called an intermediate part. A front of the intermediate part may be closed by a tool post front cover 131. A top of the intermediate part may be closed by a tool post ceiling cover 132. The tool post ceiling cover 132 may have a plurality of louvers 1322. The tool post front cover 131 and the tool post ceiling cover 132 may slightly project toward the machining chamber 11 from the intermediate part. The tool post front cover 131 and the tool post ceiling cover 132 may thereby cover a left end part of the machining chamber 11 as shown in FIG. 2. The operation panel 15 may be arranged above the headstock chamber 12. The operation panel 15 may be an input apparatus capable of operating the NC lathe 1. An operator of the NC lathe 1 may check an operation done in the machining chamber 11 through the window 111 and then input on the operation panel 15. The operator may repeat a series of check and input for adjustment. The tool post front cover 131 may have a large chamfered shape 131a formed between a front part projecting forwards and a side part near the operation panel 15. Such configuration ensures the operator's view when the turns his eyes between the machining chamber 11 and the operation panel 15. Furthermore, such configuration facilitates the operator's action when be tries to reach the operation panel 15 as looking in at the window 111 or as moving away from the machining chamber 11, thereby improving the operability of the NC lathe 1.

Figure 3:
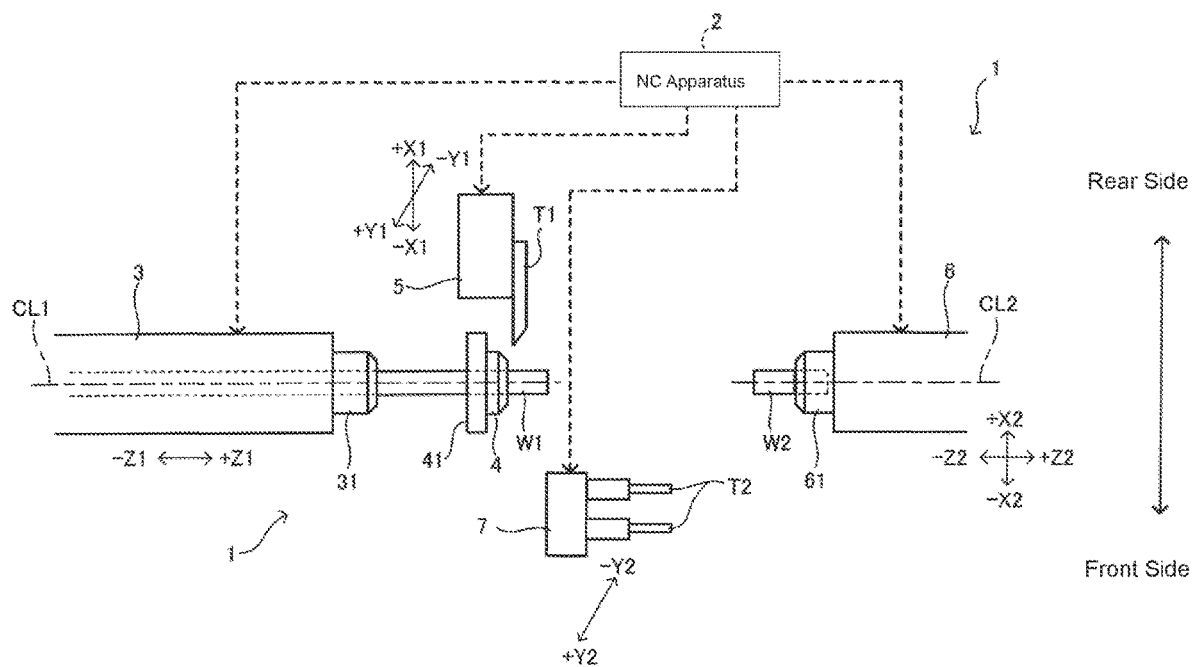
FIG. 3 is a schematic plan view of an internal configuration of the NC lathe.

FIG. 3 is a schematic plan view of an internal configuration of the NC lathe as shown in FIG. 1

As shown in FIG. 3, the NC lathe 1 may internally have an NC apparatus 2, a first headstock 3, a guide bush 4, the first tool post 5, a second headstock 6, and a second tool post 7 for a second spindle. The NC apparatus 2 may store an NC program. The NC apparatus 2 may be a computer capable of controlling the first headstock 3, the first tool post 5, the second headstock 6, and the second tool post 7 in accordance with the NC program. A tool T1 including a rotary tool may be attached to the first tool post 5. A tool T2 including a rotary tool may be attached to the second tool post 7. The NC apparatus 2 may control rotation of the rotary tool. The NC apparatus 2 may control the operation of the NC lathe 1 according to an input directly given through the operation panel 15.

The first headstock 3 may be arranged inside the headstock chamber 12 as shown in FIG. 1. The first headstock 3 may have a first spindle 31 mounted thereon. The first spindle 31 may be an example of the spindle. The first headstock 3 having the first spindle 31 thereon may be movable in a Z1-axis direction. The Z1-axis direction may be a horizontal direction, which is a right-left direction in FIG. 3. Only for convenience of the description, the right side in FIG. 3 may be referred to as "front" and the left side as "back". The forward direction may match with a +Z1 direction. The backward direction may match with a −Z1 direction. The first spindle 31 may have a first chuck such as a collet at the front end thereof. A bar workpiece W1 may be inserted into the first spindle 31 from the back end of thereof. The first spindle 31 may releasably hold the workpiece W1 by the first chuck. The first spindle 31 holding the workpiece W1 may be rotatable on a first spindle axis CL1. The first spindle axis CL1 may be an example of the spindle axis. The direction of the first spindle axis CL1 may match with the Z1-axis direction. The first spindle 31 may be provided with a motor such as a built-in motor. The first spindle 31 may be driven by the motor in response to a command from the NC apparatus 2. The workpiece W1 held by the first spindle 31 may be thereby rotatable on the first spindle axis CL1.

The guide bush 4 may be placed in front of the first spindle 31 and secured to the guide bush supporting bed 41 on the base of the NC lathe 1. The guide bush 4 may slidably support the front end of the workpiece W1 inserted through the first spindle 31. The workpiece W1 may be thereby slidable in the Z1-axis direction. Part of the guide bush 4 that supports the workpiece W1 may be rotatable on the first spindle axis CL1 synchronously with the first spindle 31. The first spindle axis CL1 may be a rotational axis of the workpiece W1 supported by the guide bush 4. The guide bush 4 can suppress a bend of the workpiece W1 during machining, thereby providing higher accuracy especially for a longer workpiece. The front part of the guide bush 4 may be exposed inside the machining chamber 11.

Figure 7:
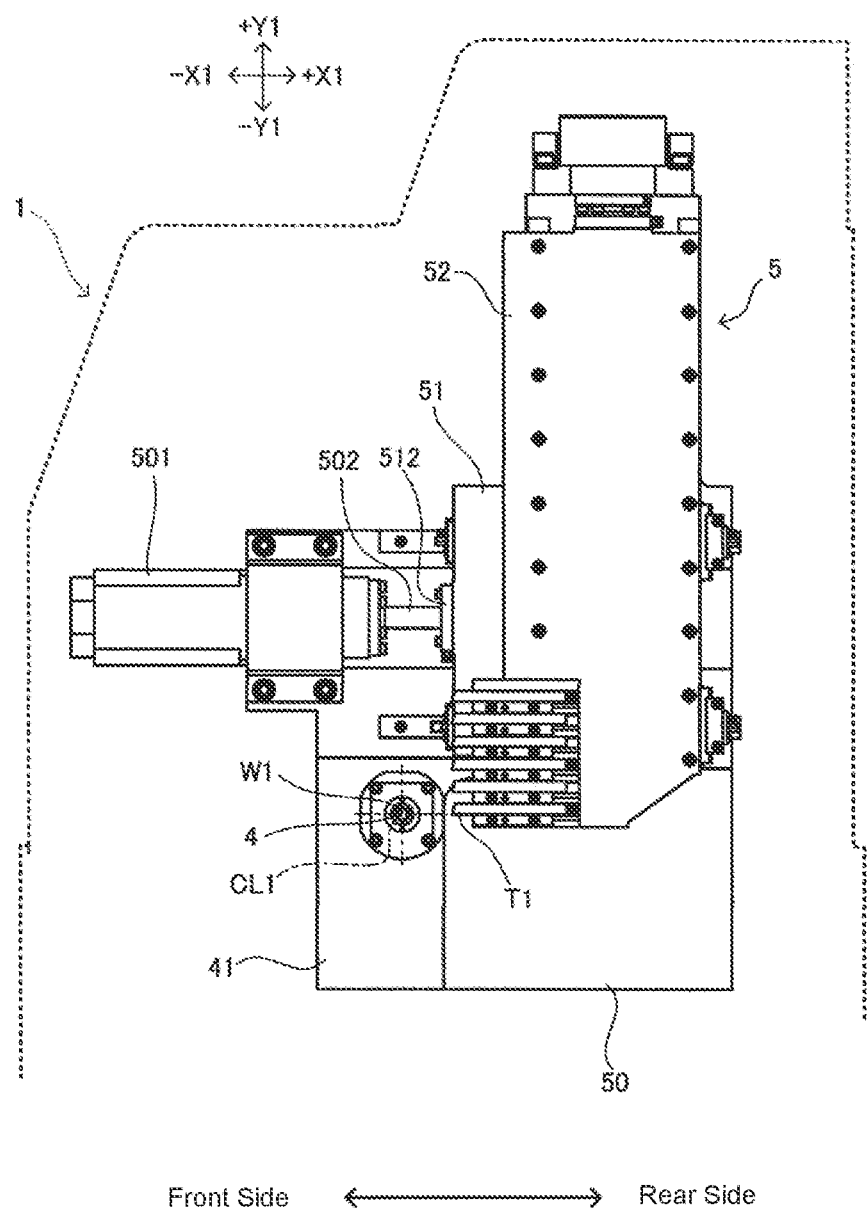
FIG. 7 is a right-side view of a tool post base, a first tool post, and a guide bush of the NC lathe as seen from right in FIG. 2.

The first tool post 5 may be arranged on the rear side of the NC lathe 1 with respect to the first spindle axis CL1. The first tool post 5 may be movable in a horizontal X1-axis direction perpendicular to the Z1-axis direction and in a vertical Y1-axis direction perpendicular to the Z1-axis direction. The first tool post 5 may be an example of the tool post. The up-down direction of FIG. 3 may be the X1-axis direction and a direction perpendicular to paper may be the Y1-axis direction. The tool T1 capable of machining the workpiece W1 may be attached to the first tool post 5. FIG. 3 shows the first tool post 5 equipped with the tool T1. The first tool post 5 may have the plural tools T1 aligned in the Y1-axis direction including a turning tool and a cut-off tool. The first tool post 5 may be provided with a first tool post table 52 (FIG. 7). Movement of the first tool post table 52 in the Y1-axis direction may provide selection of one of the tools T1. The first tool post 5 may move in the cutting direction to allow the selected tool T1 to cut into the workpiece W1 held by the first spindle 31. The cutting direction of the tool T1 may be the direction toward the front side of the NC lathe 1, which is shown as a −X1 direction in FIG. 3. The configuration of the first tool post 5 is being described below. Most part of the first tool post 5 may be disposed in the intermediate part. The front part of the first tool post 5 and the tool T1 may be exposed inside the machining chamber 11.

The second headstock 6 may be placed in front of the guide bush 4 and disposed in the machining chamber 11 as shown in FIG. 1. The second headstock 6 may have a second spindle 61 mounted thereon. The second headstock 6 having the second spindle 61 thereon may be movable in an X2-axis direction and a Z2-axis direction. The X2-axis direction may be the same as the X1-axis direction. The Z2-axis direction may be the same as the Z1-axis direction. The second spindle 61 may have a second chuck such as a collet at the back end thereof. The second spindle 61 may chuck the end of the workpiece W1 that has been finished by the first spindle 31. The first spindle 31 and the second spindle 61 may synchronously rotate to cut off the workpiece W1 with the cut-off tool. Alternatively, the first spindle 31 may release the workpiece W1 and only the second spindle 61 may rotate to cut off the workpiece W1 with the cut-off tool. A cut-off workpiece W2 may be received by the second spindle 61. The second spindle 61 may releasably hold the cut-off workpiece W2 by the second chuck. The second spindle 61 holding the cut-off workpiece W2 may be rotatable on a second spindle axis CL2. The direction of the second spindle axis CL2 may match with the Z2-axis direction. The second spindle 61 may be provided with a motor such as a built-in motor. The second spindle 61 may be driven by the motor in response to a command from the NC apparatus 2. The cut-off workpiece W2 held by the second spindle 61 may be thereby rotatable on the second spindle axis CL2. The second spindle 61 may be opposite the first spindle 31. The second spindle 61 may be also called an opposite spindle.

The second tool post 7 for the second spindle may be placed in front of the guide bush 4 and displaced to the front side of the NC lathe 1 with respect to the guide bush 4 and the first spindle axis CL1. The second tool post 7 may be movable in a Y2-axis direction. The Y2-axis direction may be the same as the Y1-axis direction. The second tool post 7 may be equipped with the tool T2 capable of machining the cut-off workpiece W2 held by the second spindle 61. FIG. 3 shows the second tool post 7 equipped with the tool T2. The second tool post 7 may have a not-shown product receiver. The second tool post 7 may have the plural kinds of tools T2 including a drill and an endmill. The tools T2 may be aligned in the X2-axis direction and in the Y2-axis direction though not shown in FIG. 3. Movement of the second tool post 7 in the Y2-axis direction may provide selection of one of the plural kinds of tools T2. The second headstock 6 may move in the −Z direction to machine a back end of the cut-off workpiece W2 held by the second spindle 61. The second tool post 7 may be placed in the machining chamber 11 as shown in FIG. 1.

Figure 4:
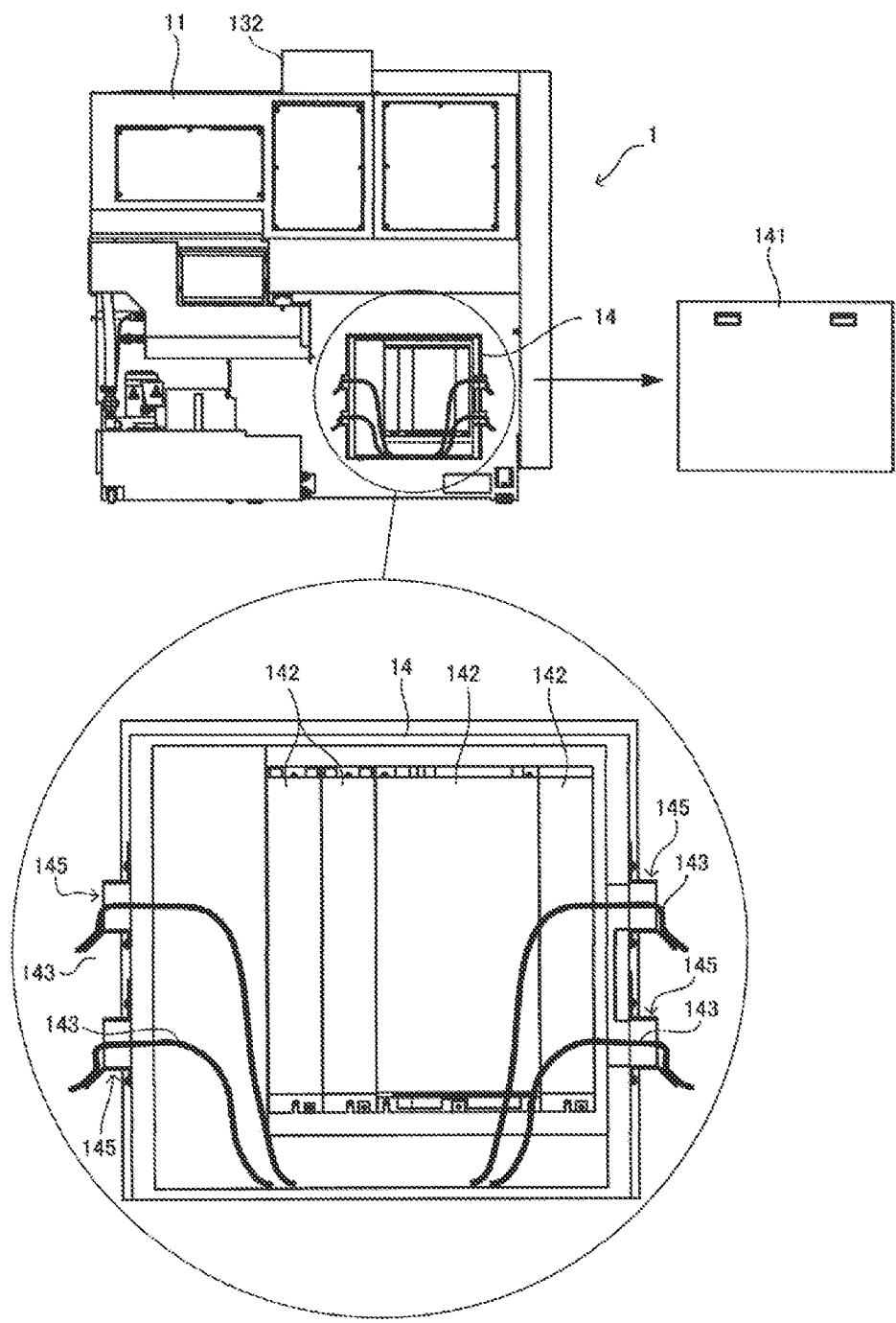
FIG. 4 is a rear view of the NC lathe.

FIG. 4 is a rear view showing the appearance of the NC lathe as shown in FIG. 1.

As shown in FIG. 4, a distribution board chamber 14 may be provided at a lower part of the rear side of the NC lathe 1. The distribution board chamber 14 may be closed by a distribution board cover 141. FIG. 4 shows a state that the distribution board cover 141 has been removed. An expanded view of the distribution board chamber 14 shows a plurality of electrical units 142 internally having, for example, an amplifier and a controller. The electrical unit 142 may be secured with a screw. The electrical unit 142 may be drawn out of the chamber 14 to this side of paper in FIG. 4 only by removing the screw. The electrical unit 142 can be drawn out of the chamber 14 as required for maintenance and repair. The electrical unit 142 may have a cable 143 connected to an actuator and an electrical component provided in the NC lathe 1. FIG. 4 only shows the cables 143 around the chamber 14. Other cables are not shown. The cable 143 may be connected to the electrical unit 142 through a cable entry 145 provided at the right or left side of the chamber 14. The two cable entries 145 may be formed on each of the right and left sides of the chamber 14.

Figure 5:
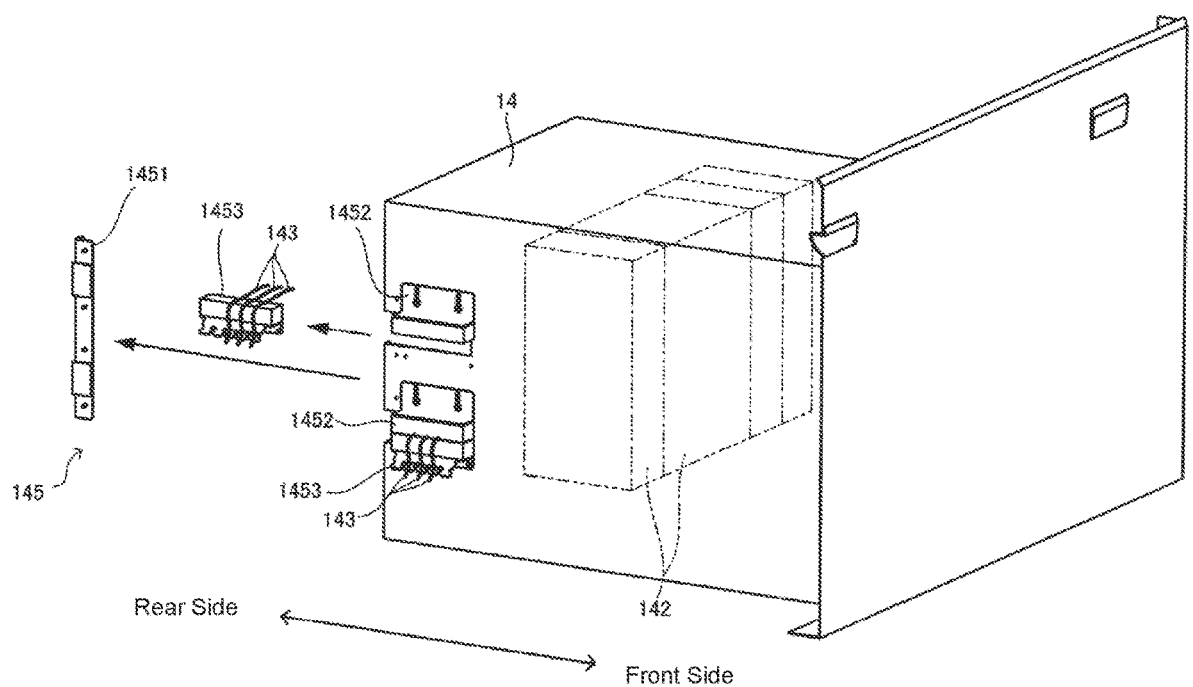
FIG. 5 is a perspective view of a distribution board chamber as shown in FIG. 4 as seen from obliquely above on the front side of the NC lathe.

FIG. 5 is a perspective view of the distribution board chamber as shown in FIG. 4 as seen from obliquely above on the front side of the NC lathe 1.

As shown in FIG. 5, the cable entry 145 may include a entry faster 1451, an upper holder 1452, and a lower holder 1453. The entry fastener 1451, the upper holder 1452, and the lower holder 1453 may be secured to the side surface of the distribution board chamber 14 with screws. The upper holder 1452 and the lower holder 1453 may be opposite with respect to the up-down direction. Part of them opposite to each other may be formed of sponge material. The cable 143 may be sandwiched between the sponge material of the upper holder 1452 and the sponge material of the lower holder 1453. The lower holder 1453 may be provided with a metal fitting having a Ω-shaped groove to fasten part of the cable 143, which is drawn out of the distribution board chamber 14, with a binding band. The lower holder 1453 may be removed out of the distribution board chamber 14 by removing the screw after removing the entry faster 1451. FIG. 5 shows a state that the entry faster 1451 has been removed and the lower holder 1453 for the upper cable entry 145 has been removed. The lower holder 1453 may be removed, and then the electrical unit 142 (FIG. 4) near the side surface of the distribution board chamber 14 may be smoothly drawn out without interference with the cable 143. Such configuration allows the electrical unit 142 to be readily drawn out of the chamber 14, which facilitates the maintenance.

Figure 6:
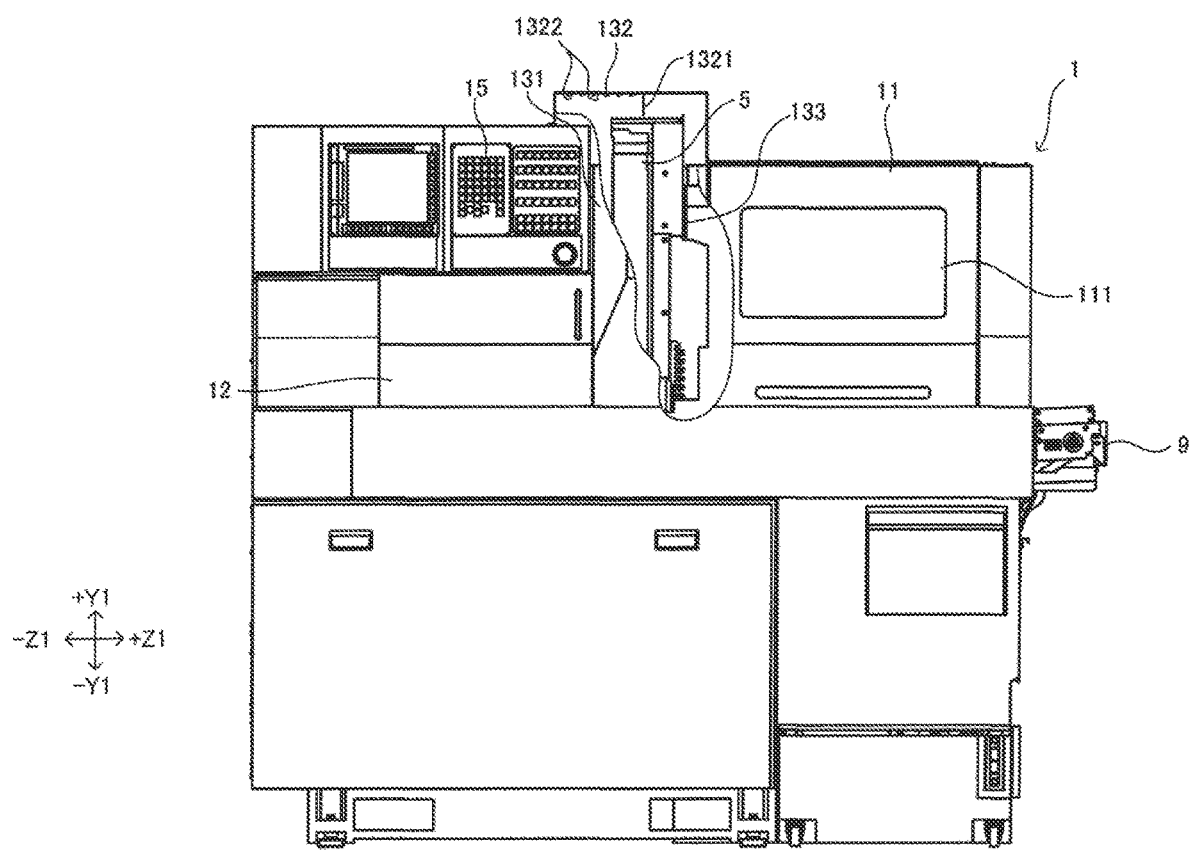
FIG. 6 is a front view of an internal configuration of the NC lathe whose housing on the front side of the NC lathe is partially cut.

FIG. 6 is a front view of an internal configuration of the NC lathe whose housing on the front side of the NC lathe 1 is partially cut.

As shown in FIG. 6, the upper side of the first tool post 5 may be closed by the tool post ceiling cover 132. There may be an intermediate wall 133 provided between the machining chamber 11 and the intermediate part. In the machining chamber 11, a large amount of coolant may be poured to remove heat from part of the workpiece under machining. The coolant accumulated inside the machining chamber 11 may be collected and recycled. The intermediate part and the machining chamber 11 may be divided by the intermediate wall 133 and the front surface of the first tool post 5. This prevents entry of coolant into the intermediate part and the headstock chamber 12. The prevention, however, sometimes fails due to entry of liquid or mist into the tool post ceiling cover 132 through a gap around the upper end of the first tool post 5. As described above, the tool post ceiling cover 132 may have the plurality of louvers 1322 through which air inside the NC lathe 1 is discharged to the outside. Entry of coolant into the tool post ceiling cover 132 would be a cause of oily smell and stains in the surrounding environment of the NC lathe 1. Entry of coolant into the headstock chamber 12 may be possible also through the intermediate part. Entry of coolant into the headstock chamber 12 could deteriorate the life of the first headstock 3 and the first spindle 31 and impede maintenance due to oily stains. The embodiment provides a partition board 1321 hanging down from the ceiling surface of the tool post ceiling cover 132 around the center with respect to the Z1-axis direction. The louvers 1322 may be limited in an area on the back side (−Z1 direction) of the partition board 1321. The embodiment provides interruption of the coolant entering through the tool post ceiling cover 132 by the partition board 1321, thereby preventing further entry into the back side of the partition board 1321. The embodiment can effectively suppress leak of coolant to the outside of the NC lathe 1 and entry of coolant into the headstock chamber 12.

FIG. 7 is a right-side view of a tool post base, the first tool post, and the guide bush of the NC lathe as seen from right in FIG. 2. The contours of the NC lathe 1 is shown by a broken line.

As shown in FIG. 7, the first tool post 5 may be mounted on a tool post base 50. The first tool post 5 may include a first intermediate base 51 and the first tool post table 52 mounted on the first intermediate base 51. The first intermediate base 51 may be movable in the X1-axis direction. The first tool post table 52 may be movable in the Y1-axis direction. The first tool post table 52 may be in front of the first intermediate base 51. In FIG. 7 a direction perpendicular to paper may match with the Z1-axis direction and this side of paper may be the front. The first intermediate base 51 may be arranged in the intermediate part. The front part of the first tool post table 52 may be exposed in the machining chamber 11. The tool post base 50 may be secured to the not-shown base. The first intermediate base 51 may be mounted on the tool post base 50 movably in the X1-axis direction. The first tool post table 52 may be mounted on the first intermediate base 51 movably in the Y1-axis direction. The first tool post table 52 may have a not-shown Y1-axis ball screw nut fixed thereon. A not-shown Y1-axis ball screw may be coupled to an output shaft of a not-shown Y1-axis motor. The Y1-axis ball screw may have a spiral groove on the periphery. The Y1-axis ball screw nut may internally have a ball engaged with the groove of the Y1-axis ball screw. Driving a not-shown Y-axis motor may rotate the Y1-axis ball screw to move the first tool post table 52 in the Y1-axis direction. FIG. 7 shows a state that the first tool post table 52 is in the origin position in the Y1-axis direction. The tool post base 50 may be integrally formed with the guide bush supporting bed 41.

An X1-axis motor 501 may be secured to the tool post base 50. The X1-axis motor 501 may be an example of the motor. The X1-axis motor 501 may be arranged on the front side of the NC lathe 1 with respect to the first tool post 5. The X1-axis motor 501 may be arranged further above the guide bush 4 and the first spindle 31 (FIG. 3). The X1-axis motor 501 may have an X1 output shaft 5011 (FIG. 8A) to which a coaxial X1-axis ball screw 502 is coupled. The coupling structure is being described below. Driving a stator of the X1-axis motor 501 may rotate the X1-output shaft 5011 along with a rotor to thereby rotate the X1-axis ball screw 502 coupled to the X1 output shaft 5011. The X1-axis ball screw 502 having a spiral groove on the periphery may extend in a direction perpendicular to the first spindle axis CL1. Specifically, the X1-axis ball screw 502 may extend in the X1-axis direction. The X1-axis direction may be an example of the axial direction. The X1-axis ball screw 502 may be an example of the driving shaft. The first intermediate base 51 may have an X1-axis ball screw nut 512. The X1-axis ball screw nut 512 may be an example of the driven unit. The X1-axis ball screw nut 512 may internally have a ball engaged with the groove of the X1-axis ball screw 502. Driving the X1-axis motor 501 may rotate the X1-axis ball screw 502 to move the first intermediate base 51 in the X1-axis direction. FIG. 7 shows a state that the first intermediate base 51 is in the origin position in the X1-axis direction.

The structure and operation of the first tool post is being described in detail.

Figure 8A:
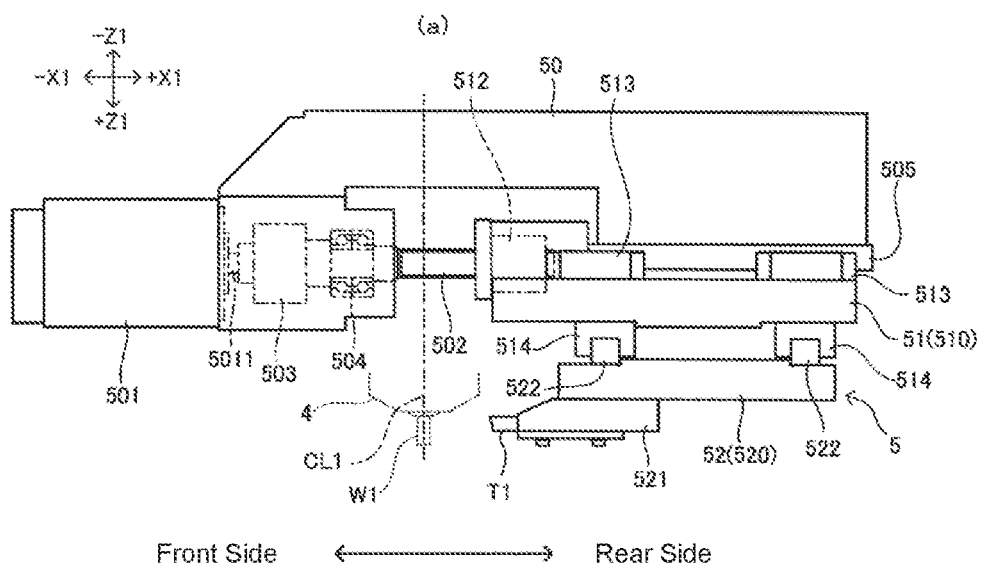
FIG. 8A is a schematic plan view of a bottom part of the tool post base and the first tool post of the NC lathe.
Figure 8B:
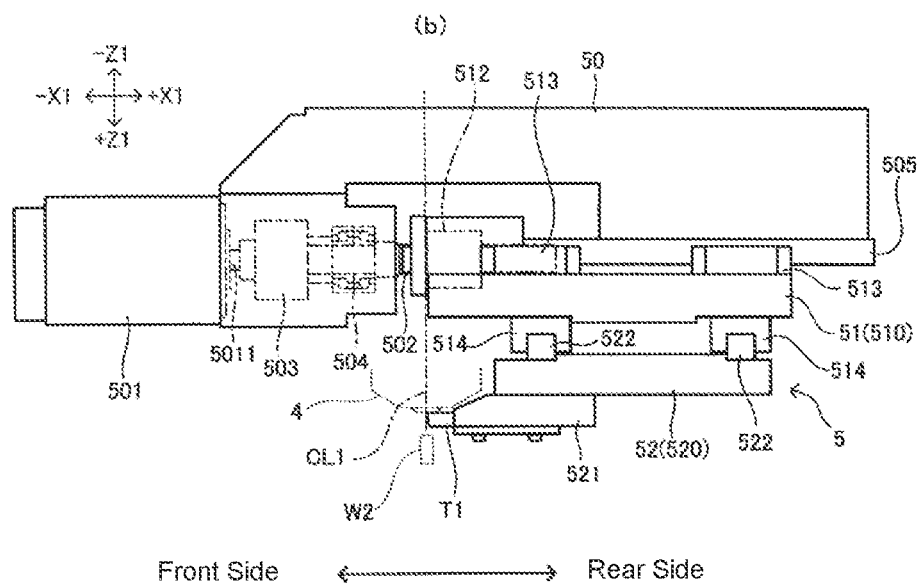
FIG. 8B is a schematic plan view showing a state that an intermediate base has moved in a −X1 direction from the FIG. 8A state.

FIG. 8A is a schematic plan view of a lower part of the tool post base and the first tool post of the NC lathe. FIG. 8A shows a state that the intermediate base is in the origin position in the X1-axis direction. FIG. 8B is a schematic plan view showing a state that the intermediate base has moved in the −X1 direction from the FIG. 8A state. In FIG. 8A, the guide bush 4 and the workpiece W1 are shown by a broken line. In FIG. 8B, the guide bush 4 and the cut-off workpiece W2 are shown by a broken line.

As shown in FIG. 8A, the first tool post table 52 may include a table body 520, a tool holder 521 for the tool T1, and a Y1-axis slide 522. The tool holder 521 and the Y1-axis slide 522 may be mounted on the table body 520. The first intermediate base 51 may include a base body 510, an X1-axis slide 513, and a Y1-axis rail 514 in addition to the Y1-axis motor and the X1-axis ball screw nut 512. Other components of the first intermediate base 51 may be mounted on the base body 510. The Y1-axis rail 514 may extend in the Y1-axis direction perpendicular to paper. The Y1-axis slide 522 may be slidably mounted on the Y1-axis rail 514. The first tool post table 52 may be thereby movably mounted on the first intermediate base 51. The first tool post table 52 may be movable in the Y1-axis direction by the Y1-axis motor as described above.

The tool post base 50 may have an X1-axis rail 505 secured thereon. The X1-axis rail 505 may extend in the X1-axis direction. The X1-axis slide 513 may be slidably mounted on the X1-axis rail 505. The first intermediate base 51 may be mounted on the tool post base 50 slidably in the X1-axis direction. An X1-axis coupling 503 may be provided on the tool post base 50. The X1-axis coupling 503 may couple the X1 output shaft 5011 of the X1-axis motor 501 and the X1-axis ball screw 502. An X1-axis support bearing 504 may be also provided in the tool post base 50. The X1-axis support bearing 504 may be an example of the movement restricting unit. The X1-axis support bearing 504 may be provided on an end of the X1-axis ball screw 502 with respect to the axial direction. The X1-axis support bearing 504 may be a roller bearing having a roller between an outer ring and an inner ring. The outer ring of the X1-axis support bearing 504 may be secured to the tool post base 50. The inner ring of the X1-axis support bearing 504 may be connected to the X1-axis ball screw 502. The X1-axis ball screw 502 may be thereby secured to the tool post base 50 rotatably with respect to the X1-axis direction. Movement of the X1-axis ball screw 502 may be thereby restricted by the X1-axis support bearing 504 except rotation with respect to the X1-axis direction. Rotation of the X1-axis ball screw 502 may rotate the X1-axis ball screw nut 512 engaged with the X1-axis ball screw 502 to move in the +X direction or in the −X1 direction according to rotational direction. The first intermediate base 51 along with the first tool post table 52 may thereby move in the same direction as the X1-axis ball screw nut 512 moves. The first tool post 5 may thereby move in the +X direction or in the −X1 direction.

As shown in FIG. 8B, the tool T1 may cut into the workpiece W1 when the X1-axis motor 501 is driven to move the first tool post 5 in the −X1 direction. The −X1 direction may be an example of the cutting direction that the tool T1 cuts into the workpiece W1. The −X1 direction may be a direction that the X1-axis ball screw nut 512 approaches the X1-axis support bearing 504. The −X1 direction may be also a direction that the X1-axis ball screw nut 512 approaches the X1-axis motor 501. The workpiece W1 may be cut off with a cut-off tool, an example of the tool T1, when the distal end of the tool reaches the first spindle axis CL1. FIG. 8B shows a state that the cutting edge of the tool has reached the first spindle axis CL1 and the front part of the workpiece W1 has been cut off into the cut-off workpiece W2. It may be usual that the front part of the workpiece W1 has been first chucked by the second spindle 61 (FIG. 3) and then cut off. The cut-off workpiece W2 may be then received by the second spindle 61. A back part (−Z side) of the cut-off workpiece W2 held by the second spindle 61 may be machined with the tool T2 (FIG. 3).

In the NC lathe 1 of this embodiment, when the tool T1 moves in the cutting direction that the tool T1 cuts into the workpiece WL, the X1-axis ball screw nut 512 may approach the X1-axis support bearing 504. The X1-axis ball screw nut 512 and the X1-axis support bearing 504 may be thereby placed in proximity during machining. The X1-axis ball screw nut 512 may be in the position close to the X1-axis support bearing 504 when the tool T1 is applied to the workpiece W1. The X1-axis ball screw 502 is likely expanded in the X1-axis direction due to friction heat generated during machining. A lot of products may be generally produced of a long workpiece W1 from a start to completion of machining. There may occur undesired variation in a cut-in amount by the tool T1 between the early period and the later period of machining due to a small change in the length of the X1-axis ball screw 502. The embodiment may bring the X1-axis ball screw nut 512 close to the X1-axis support bearing 504. This can suppress variation in a cut-in amount by the tool T1 regardless of thermal expansion of the X1-axis ball screw 502 in the X1-axis direction, thereby improving machining accuracy of the workpiece W1. It is comparatively assumed that the X1-axis motor 501 is arranged on the further rear side of the lathe than the tool post arranged on the rear side of the lathe with respect to the spindle axis. The X1-axis motor 501 and the support structure thereof would project rearwards, thereby making the NC lathe 1 larger in size. In other words, if the X1-axis motor 501 is arranged on the side opposite the cutting direction that the tool T1 cuts into the workpiece W1, the first tool post 5 and the X1-axis motor 501 are both disposed side by side on the rear side of the first spindle, thereby increasing the machine size. The embodiment may include the first tool post 5 arranged on the rear side of the NC lathe 1 with respect to the first spindle axis CL1. Furthermore, the X1-axis motor 501 may be arranged on the front side of the NC lathe 1 with respect to the first tool post 5. This makes the NC lathe 1 smaller in size. In other words, the X1-axis motor 501 may be arranged on the side facing the cutting direction that the tool T1 cuts into the workpiece W1 with respect to the first tool post 5. Such configuration reduces the machine size. Furthermore, the X1-axis ball screw nut 512 may be arranged in a position on the front side of the first tool post 5 (in a position on the side facing the direction that the tool cuts into the workpiece) where the X1-axis motor 501 and the X1-axis support bearing 504 are provided. The first intermediate base 51 may be thereby movable in the X1-axis direction regardless of the length of the X1-axis ball screw 502. Furthermore, the embodiment may bring the X1-axis ball screw nut 512 close to the X1-axis support bearing 504. This can suppress variation in a cut-in amount by the tool T1 regardless of thermal expansion of the X1-axis ball screw 502 in the X1-axis direction, thereby improving machining accuracy of the workpiece W1. Furthermore, the cutting edge of the tool T1 may be in a position overlapping the X1-axis ball screw nut 512 with respect to the X1-axis direction. The cutting edge of the tool T1 can be protected from any thermal expansion in the X1-axis direction of the base body 510 and the first tool post table 52 provided between the X1-axis ball screw nut 512 and the tool T1, thereby improving machining accuracy of the workpiece W1. Furthermore, such overlapping configuration of the tool T1 and the X1-axis ball screw nut 512 further improves machining accuracy.

A modified embodiment is being described. The same component as the embodiment described above is being referred to by using the same symbol. Any repeated description is being omitted as the case may be.

Figure 9:
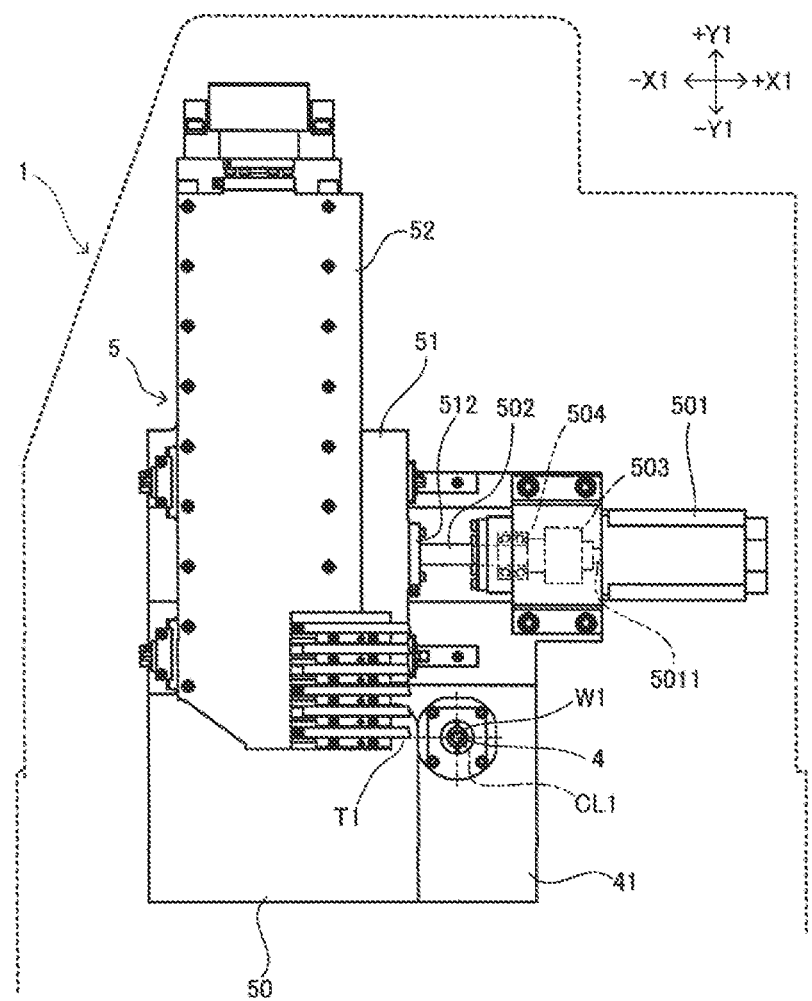
FIG. 9 is a right-side view similar to FIG. 7 of a modified embodiment of the NC lathe.

FIG. 9 is a right-side view similar to FIG. 7 of the modified embodiment of the NC lathe. The X1-axis coupling 503, the X1-axis support bearing 504, ant the X1-axis output shaft 5011 are shown by two-dot lines.

As shown in FIG. 9, the modified embodiment may be different from the embodiment described above in positional relation of the first tool post 5 and the X1-axis motor 501. The first tool post 5 may be arranged on the front side of the NC lathe 1 with respect to the spindle axis. The X1-axis motor 501 may be arranged on the rear side of the NC lathe 1 with respect to the first tool post 5. The X1-axis motor 501 may be arranged further above the guide bush 4 and the first spindle 31 (FIG. 3). The X1 output shaft 5011 of the X1-axis motor 501 may be coupled with the X1-axis ball screw 502 coaxially extended. The X1-axis ball screw 502 may extend in the X1-axis direction perpendicular to the first spindle axis CL1. The X1-axis ball screw 502 may have a spiral grove on the periphery. FIG. 9 shows a state that the first intermediate base 51 may be in the origin position with respect to the X1-axis direction.

The tool T1 may cut into the workpiece W1 when the X1-axis motor 501 is driven to the move the first tool post 5 in the +X direction from the position as shown in FIG. 9. The +X direction may be an example of the cutting direction that the tool cuts into the workpiece. The +X direction may be a direction that the X1-axis ball screw nut 512 may approach the X1-axis support bearing 504. The +X direction may be a direction that X1-axis ball screw nut 512 may approach the X1-axis motor 501. The X1-axis ball screw nut 512 may be arranged in a position on the rear side of the first tool post 5 (in a position on the side facing the direction that the tool cuts into the workpiece). The X1-axis motor 501 may be arranged in a position on the side facing the direction that the tool cuts into the workpiece with respect to the first tool post 5. The first tool post 5 may be arranged on the front side of the NC lathe 1 with respect to the first spindle axis CL1. The X1-axis motor 501 may be arranged on the rear side of the NC lathe 1 with respect to the first tool post 5. This modified embodiment can provide similar effects as the embodiment described above.

The invention may be embodied in a variety of modifications within a range of the claims. For example, the X1-axis output shaft 5011 of the X1-axis motor 501 and the X1-axis ball screw 502 coaxially arranged may be directly coupled with the X1-axis coupling 503 as described above. Alternatively, the X1-axis output shaft 5011 and the X1-axis ball screw 502 non-coaxially arranged may be indirectly coupled with a drive transmission element such as a driving belt and a gear. The X1-axis direction may be angled with the horizontal direction. The Y1-axis direction may be angled with the vertical direction. The X1-axis direction may be the vertical direction while the Y1-axis direction may be the horizontal direction.

Any element included only in the specific embodiment as described above may be applied to any other modification.

What is claimed is:

1. A lathe comprising:
   a spindle configured to hold a workpiece and rotate on a spindle axis;
   a tool post comprising at least one tool holder including a tool, the tool holder extending along a tool holder axis; the tool being configured to machine the workpiece by moving the tool post in a direction towards a front side on which the tool cuts into the workpiece held by the spindle; wherein in a plan view of the lathe, the tool holder axis is substantially perpendicular to the spindle axis;
   a driving shaft extended in an axial direction perpendicular to the spindle axis and configured to move the tool post in the axial direction; and
   a movement restricting unit provided on an end of the driving shaft with respect to the axial direction to restrict movement of the driving shaft in the axial direction;
   wherein the tool post is provided with a driven unit engaged with the driving shaft, and the driven unit is movable in the axial direction according to rotation of the driving shaft,
   wherein the axial direction comprises a direction that the driven unit approaches the movement restricting unit,
   wherein the direction that the driven unit approaches the movement restricting unit faces the same direction as the direction that the tool cuts into the workpiece, and
   wherein in the plan view, an orthogonal projection of a cutting edge of the tool, projecting in a direction substantially parallel to the spindle axis so as to project onto the driving shaft, partially coincides with the driven unit.

2. The lathe of claim 1, wherein the driven unit on the tool post is arranged in a position on a side facing the direction that the tool cuts into the workpiece.

3. The lathe of claim 1 further comprising a motor configured to rotate the driving shaft, wherein the motor is arranged on a side facing the direction that the tool cuts into the workpiece with respect to the tool post.

4. The lathe of claim 2 further comprising a motor configured to rotate the driving shaft, wherein the motor is arranged on the side facing the direction that the tool cuts into the workpiece with respect to the tool post.

5. The lathe of claim 1 further comprising a motor configured to rotate the driving shaft, wherein the tool post is arranged on a rear side of the lathe with respect to the spindle axis, and the motor is arranged on a front side of the lathe with respect to the tool post.

6. The lathe of claim 2 further comprising a motor configured to rotate the driving shaft, wherein the tool post is arranged on a rear side of the lathe with respect to the spindle axis, and the motor is arranged on a front side of the lathe with respect to the tool post.

7. The lathe of claim 1 further comprising a motor configured to rotate the driving shaft, wherein the tool post is arranged on a front side of the lathe with respect to the spindle axis, and the motor is arranged on a rear side of the lathe with respect to the tool post.

8. The lathe of claim 2 further comprising a motor configured to rotate the driving shaft, wherein the tool post is arranged on a front side of the lathe with respect to the spindle axis, and the motor is arranged on a rear side of the lathe with respect to the tool post.

\* \* \* \* \*